116,863

UNITED STATES PATENT OFFICE.

MARIE EULALIE PERRIN, OF MONTREAL, CANADA.

IMPROVEMENT IN MEDICAL COMPOUNDS FOR TREATING DISEASES OF THE LUNGS, CHEST, &C.

Specification forming part of Letters Patent No. 116,863, dated July 11, 1871.

*To all whom it may concern:*

Be it known that I, MARIE EULALIE PERRIN, of the city of Montreal, in the district of Montreal and Province of Quebec, have invented a certain new and useful Medical Compound to be called or known as "Cyano Pancreatine," of which the following is a specification.

My invention relates to a medical compound to be used as a remedy in diseases of the chest and lungs, and also in the various affections arising from disorders of digestion.

To prepare this compound, I take of lard, two pounds; animal pancreas, eight ounces; alcohol, one quart; water, two quarts; bitter-almond oil, fifty drops; and mix the whole well together.

Directions for use: A dessert-spoonful three or four times a day, thoroughly incorporated with a little milk or water and sweetened to the taste.

What I claim as new, and desire to secure by Letters Patent, is—

The medical compound composed of lard, animal pancreas, alcohol, and bitter-almond oil, mixed together, substantially as and for the purpose set forth.

MARIE EULALIE PERRIN.

Witnesses:
THOS. A. CONNOLLY,
LÉOCADIE GAELBOIS.